United States Patent
Tan et al.

(10) Patent No.: US 9,866,160 B2
(45) Date of Patent: Jan. 9, 2018

(54) POWER CONVERSION SYSTEM AND CONTROLLING METHOD THEREOF AND WIND TURBINE POWER GENERATION SYSTEM

(71) Applicant: General Electric Company, Schenectady, NY (US)

(72) Inventors: Zhuohui Tan, Shanghai (CN); Jinping Gao, Shanghai (CN); Rajni Kant Burra, Bangalore (IN); Govardhan Ganireddy, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 8 days.

(21) Appl. No.: 14/955,094

(22) Filed: Dec. 1, 2015

(65) Prior Publication Data
US 2016/0197559 A1 Jul. 7, 2016

(30) Foreign Application Priority Data
Jan. 4, 2015 (CN) .......................... 2015 1 0005177

(51) Int. Cl.
*H02J 3/36* (2006.01)
*H02P 9/00* (2006.01)
(Continued)

(52) U.S. Cl.
CPC ............. *H02P 9/007* (2013.01); *H02J 3/386* (2013.01); *H02M 5/4585* (2013.01); *H02P 23/26* (2016.02); *Y02E 10/763* (2013.01)

(58) Field of Classification Search
CPC .... H02P 9/007; H02P 2207/073; H02P 23/26; Y02E 10/76; Y02E 10/763; Y02E 40/30;
(Continued)

(56) References Cited

U.S. PATENT DOCUMENTS

| 4,461,957 A | 7/1984 | Jallen |
| 7,605,488 B2 | 10/2009 | Rebsdorf |

(Continued)

FOREIGN PATENT DOCUMENTS

| CN | 102570962 A | 7/2012 |
| CN | 102983589 A | 3/2013 |
| CN | 103050991 A | 4/2013 |

OTHER PUBLICATIONS

López, "Control of a wind turbine equipped with a variable rotor resistance", Department of Computer Science and Engineering Chalmers University of Technology University of Gothenburg Gëteborg, Sweden, pp. 1-67, May 2009.
(Continued)

*Primary Examiner* — Alex Torres-Rivera
(74) *Attorney, Agent, or Firm* — Douglas D. Zhang; GE Global Patent Operation

(57) ABSTRACT

A system includes a source side converter for being electrically coupled to a generator of a power source, a line side converter for being electrically coupled to a power network, a DC link coupled between the source side converter and the line side converter, and a controller for generating source side switching signals based on a current or torque of the generator and a virtual impedance signal for system damping or reactive power compensation when at least one detected signal of the system is not normal. A method for controlling the system is also included.

19 Claims, 4 Drawing Sheets

(51) Int. Cl.
  *H02M 5/458* (2006.01)
  *H02J 3/38* (2006.01)
  *H02P 23/26* (2016.01)

(58) Field of Classification Search
  CPC .......... Y02E 40/32; Y02E 40/34; H02J 3/386;
       H02J 3/36; H02M 5/4585; H02M 5/40;
       H02M 5/225; H02M 7/4826; H02M
       7/7575; G05F 1/70; Y02B 70/126
  USPC .................................. 323/205, 207; 363/35
  See application file for complete search history.

(56) References Cited

U.S. PATENT DOCUMENTS

| | | | |
|---|---|---|---|
| 7,855,469 B2 | 12/2010 | Stegemann et al. | |
| 7,936,078 B2 | 5/2011 | Pavlak | |
| 8,043,048 B2 | 10/2011 | Daniels et al. | |
| 8,310,074 B2* | 11/2012 | Larsen | F03D 9/003 290/44 |
| 2007/0052244 A1 | 3/2007 | Hudson | |
| 2010/0117605 A1 | 5/2010 | Kretschmann | |
| 2012/0063179 A1* | 3/2012 | Gong | H02M 1/12 363/40 |
| 2013/0195654 A1 | 8/2013 | Berger et al. | |
| 2014/0152110 A1* | 6/2014 | Sugimoto | H02J 4/00 307/66 |
| 2014/0307494 A1* | 10/2014 | Wu | H02M 7/48 363/97 |
| 2015/0188443 A1* | 7/2015 | Takeda | F03D 9/003 363/159 |
| 2016/0285252 A1 | 9/2016 | Burra et al. | |

OTHER PUBLICATIONS

Dixit et al. "Towards Pitch-Scheduled Drive Train Damping in Variable-Speed, Horizontal-Axis Large Wind Turbines", Decision and Control, 2005 and 2005 European Control Conference. CDC-ECC '05. 44th IEEE Conference on, pp. 1295-1300, Dec. 2005.
Girsang et al., "Journal of Emerging and Selected Topics in Power Electronics", Journal of Emerging and Selected Topics in Power Electronics, pp. 28-70, 2013.
Feller et al., "Wind turbine control strategy for shaft stress reduction", Industrial Technology (ICIT), 2013 IEEE International Conference on, pp. 793-798, Feb. 2013.
Machine translation and a copy of Chinese Office Action issued in connection with related CN Application No. 201510005177.5 dated Nov. 17, 2017.

* cited by examiner

POWER CONVERSION SYSTEM AND CONTROLLING METHOD THEREOF AND WIND TURBINE POWER GENERATION SYSTEM

BACKGROUND

This disclosure generally relates to systems and methods for responding to transient conditions in power generation systems and more particularly to a power conversion system, a method for controlling the power conversion system and a wind turbine power generation system.

Wind turbines are becoming increasingly used as a source of renewable energy by utility companies. One approach to achieving efficient conversion of mechanical power from blades of a wind turbine into electrical energy supplied to a grid is the use of a doubly fed induction generator (DFIG) combined with a power electronics converter.

The DFIG includes a stator connected to the grid and a rotor connected between the wind turbine and the grid. In some embodiments, a gearbox is used between the wind turbine and the DFIG to adjust a rotational speed. The power electronics converter is used to convert the mechanical power into electronic power which is then provided to the grid. In one embodiment, the power electronics converter includes a source side converter, a line side converter, a DC link connecting the two converters, and one or more controllers for the source side and line side converters.

Wind turbines often operate in complicated conditions which impose high mechanical stresses. At the wind turbine side, during grid fault or wind gust conditions, the mismatch of electrical torque and mechanical torque may result in huge mechanical stress on a tower of the wind turbine and the gearbox, which may cause the tower to shift and potentially sustain damage. Additionally, electrical torque oscillations may influence the mechanical system's lifetime and cost. At the grid side, when electrical power is converted and provided to the grid, if an impedance mismatch is present, some sub-sync oscillations (SSO) or low frequency oscillations (LFO) may occur within the voltage and current provided to the grid. Such oscillations may cause undesired harmonic distortion.

Therefore, it is desirable to provide improved systems and methods to address at least one of the above-mentioned problems.

BRIEF DESCRIPTION

In accordance with an embodiment of the invention, a power conversion system is provided. The power conversion system includes a source side converter for being electrically coupled to a generator of a power source, a line side converter for being electrically coupled to a power network, a DC link coupled between the source side converter and the line side converter, and a controller for generating source side switching signals based on a current or torque of the generator and a virtual impedance signal for system damping or reactive power compensation when at least one detected signal of the system is not normal.

In accordance with another embodiment of the invention, a method for controlling a power generation system is provided. The method includes detecting at least one signal of a power generation system, and determining whether the at least one detected signal is abnormal. When any signal of the at least one detected signal is determined to be abnormal, power conversion switching signals are generated based on a virtual impedance signal for system damping or reactive power compensation.

In accordance with still another embodiment of the invention, a wind turbine power generation system is provided. The wind turbine power generation system includes a wind turbine rotor, a generator, a converter, at least one sensor and a controller. The wind turbine rotor is for generating mechanical power. The generator is for converting the mechanical power to electrical power. The converter is for converting the electrical power to a desired electrical power for supplying to a power network. The at least one sensor is for obtaining at least one detected signal in the wind turbine power generation system. The controller is for generating converter switching signals based on a current or torque of the generator and a virtual impedance signal for system damping or reactive power compensation when the at least one detected signal of the wind turbine power generation system is not normal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Figure 1:
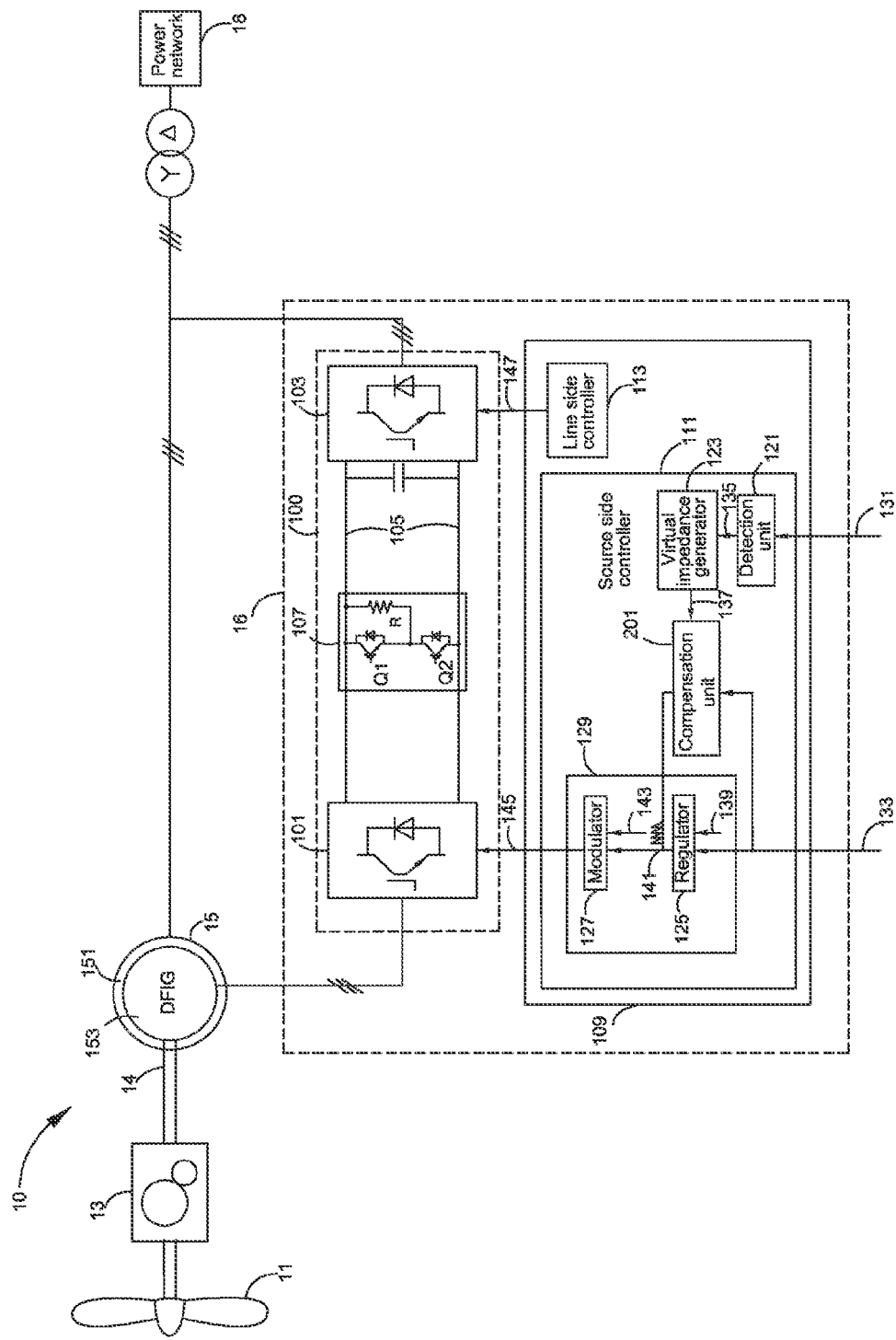
FIG. 1 is a schematic view of a power generation system including a power conversion system in accordance with one exemplary embodiment.

Referring now to FIG. 1, a schematic view of an exemplary power generation system 10 in accordance with one exemplary embodiment is shown. For purposes of illustration, the power generation system 10 (shown as a wind turbine power generation system for purposes of example) includes a power source 11 comprising a wind-driven blade assembly, a gear box 13, a generator 15 (shown as a doubly fed induction generator (DFIG) for purposes of example) and a power conversion system 16. Although a wind turbine embodiment is shown for purposes of example, other types of power sources may be used. One example is a hydro-marine kinetic energy power source. Still other examples include solar power generation sources and batteries. These other examples may not require a mechanical to electrical generator but may still have oscillations that would benefit from the virtual impedance embodiments described herein.

The power source 11 comprising the wind-driven blade assembly receives wind energy and generates mechanical energy. The gear box 13 is optional and, in embodiments wherein it is included, transmits the mechanical energy into a more suitable mechanical force to drive a rotor shaft 14. The generator 15 converts the mechanical energy into electrical energy. In one embodiment, a rotor 153 of the generator 15 is coupled to the rotor shaft 14 and is rotated by the mechanical force via the rotor shaft 14, and a stator 151 of the generator 15 is coupled to provide power to a power network 18 and may be energized by the power network 18.

The power conversion system 16 includes a power converter 100 and a controller 109. The power converter 100 is coupled between the generator 15 and the power network 18 for converting a source side electrical power into a line side electrical power for providing to the power network 18. In the specific embodiment of FIG. 1, the power converter 100 includes a source side converter 101, a line side converter 103 and a DC link 105. The source side converter 101 is electrically coupled with the rotor 153 of the generator 15. The line side converter 103 is electrically coupled with the power network 18. The DC link 105 is coupled between the source side converter 101 and the line side converter 103. In some embodiments, if desired, a single power converter may be coupled between the power source 11 and the power network 18.

The power converter 100 in the example of FIG. 1 further includes a chopper circuit 107 coupled to the DC link 105 for consuming excess power when there is a high DC voltage at the DC link 105. By using the chopper circuit 107, the DC voltage may be reduced to a normal level. In the embodiment of FIG. 1, the chopper circuit 107 includes two switches Q1, Q2 coupled in series and a resistor R coupled with one of the two switches (e.g., Q1) in parallel. In some embodiments, the chopper circuit 107 includes two switches Q1, Q2 coupled in series and an energy storage unit (not shown) such as a battery coupled with one of the two switches in parallel.

The controller 109 may include one or more suitable programmable circuits or devices such as a digital signal processor (DSP), a field programmable gate array (FPGA), a programmable logic controller (PLC), and an application specific integrated circuit (ASIC). The controller 109 may be implemented in the form of hardware, software, or a combination of hardware and software.

In the embodiment of FIG. 1, the controller 109 includes a source side controller 111 and a line side controller 113 which may comprise separate control units or be integrated within a single control unit. The line side controller 113 is configured to generate line side switching signals 147. The source side controller 111 comprises a normal controller 129. When the power generation system 10 is operated smoothly such that no torque transients or grid voltage or current oscillations are happening in the power network 18, the normal controller 129 is used in the source side controller 111. In one embodiment, the normal controller 129 may adjust a current feedback signal 133 of the generator 15 to track a current reference 139. The generator current may comprise a stator current or a rotor current. In other embodiments, the normal controller 129 may alternatively adjust an electrical torque feedback signal 133 of the generator 15 to track a torque reference 139.

In the embodiment of FIG. 1, the normal controller 129 includes a regulator 125 and a modulator 127. In embodiments wherein a current control method is used, the regulator 125 is configured to receive the current feedback signal 133 of the generator 15 and the current reference 139 and generate a control signal 141. The modulator 127 is configured to receive the control signal 141 and at least one carrier wave 143 and generate power conversion switching signals, more specifically, source side switching signals 145 by comparing the control signal 141 with the at least one carrier wave 143. In the illustrated embodiment, the carrier wave 143 includes a saw tooth wave. In other embodiments, the carrier wave 143 may include another type of carrier wave such as a triangular wave.

When abnormal operating conditions occur such as torque transients or grid voltage or current oscillations in the power network 18, a compensation unit 201 is used instead of the regulator 125, and a detection unit 121 and a virtual impedance generator 123 are further used in the embodiment of FIG. 1. The detection unit 121 is configured to receive at least one detected signal 131 of the power generation system 10 and generate an abnormal status signal 135. The power generation system 10 comprises at least one sensor (not shown) for obtaining the at least one detected signal 131. The at least one detected signal 131 may include, for example, a DC voltage at the DC link 105, a grid current, a grid voltage, an electrical power from the generator 15, or a combination thereof. In some embodiments, the abnormal status signal 135 represents an operation status of the power generation system 10. For example, when a detected DC voltage signal 131 is beyond a predetermined range or when the detected grid current or voltage is determined to include sub-sync oscillations (SSO) or low frequency oscillations (LFO), the power generation system 10 is determined to operate in an abnormal status, and the abnormal status signal 135 is generated.

The virtual impedance generator 123 generates a virtual impedance signal 137 in response to the abnormal status signal 135. The virtual impedance signal 137 may be a pre-set value or a calculated value according to certain conditions. The virtual impedance signal 137 may include a resistance, a capacitance, and/or an inductance. For example, in one embodiment, the virtual impedance signal 137 is a pre-set virtual resistance of 4 ohms. In another embodiment, the virtual impedance signal 137 is a pre-set virtual inductance of 100 μH with a series resistance of 0.2 ohms. In another embodiment, the magnitude of the virtual impedance signal 137 is determined by the required damping or oscillation compensation level and typically has an upper limit which depends upon limitations of the power converter 100 such as limitations of the voltage and/or current of the switching elements. When damping the torque or the oscillations, the virtual impedance signal 137 may be variable.

Figure 2:
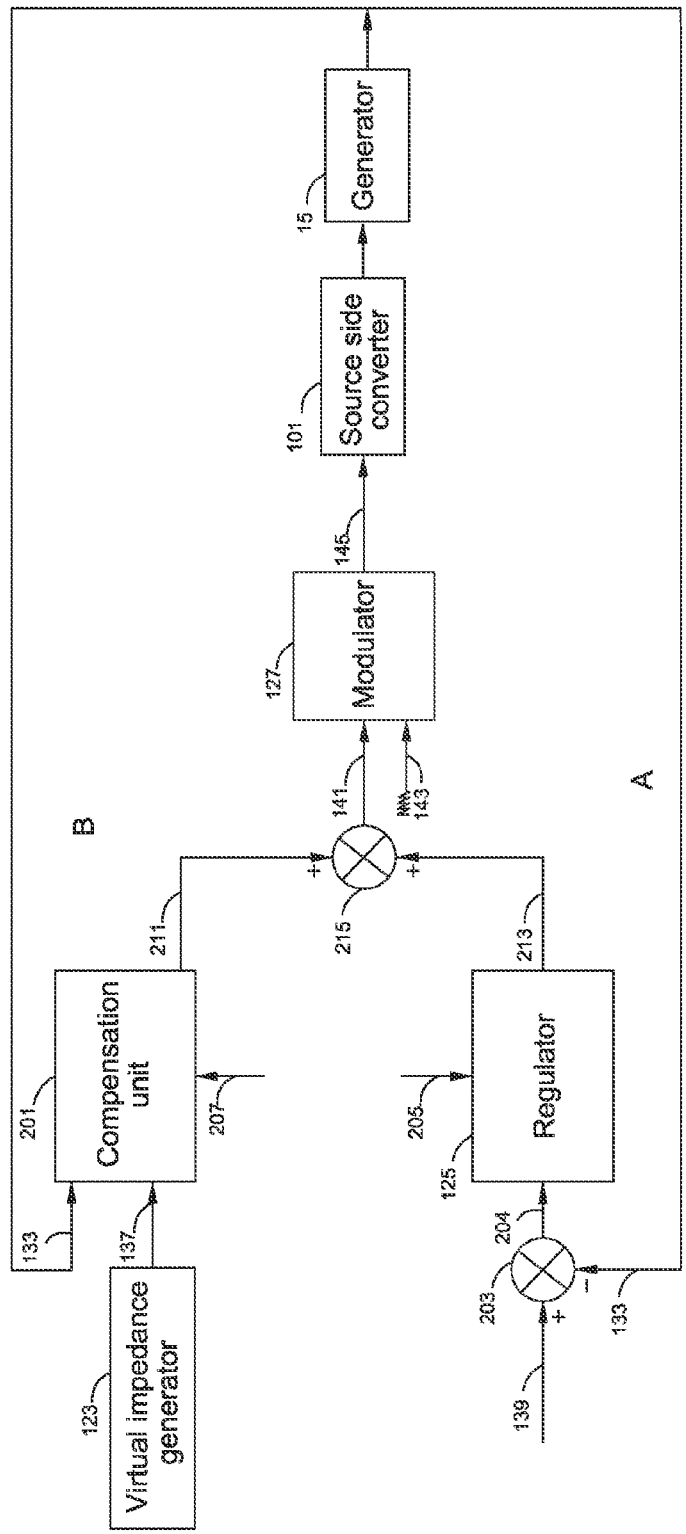
FIG. 2 is a block diagram of a controller for generating source side switching signals in accordance with one exemplary embodiment.

Referring to FIG. 2, a block diagram of the controller 109 for generating the source side switching signals 145 for the source side converter 101 of FIG. 1 in accordance with one exemplary embodiment is shown. The controller 109 comprises two control loops A and B, a first enable signal 205, and a second enable signal 207. The first enable signal 205 is for enabling or disabling the control loop A, and the second enable signal 207 is for enabling or disabling the control loop B.

Under normal operating conditions, when the detected signal 131 is normal or within a normal predetermined range, i.e. no abnormal status signal 135 exists, the control loop A is used. As shown in FIG. 2, in one embodiment, the first enable signal 205 may be set as 1 and the second enable signal 207 may be set as 0 which means that the control loop A works and the control loop B does not work. The control loop A is configured to adjust the current feedback signal 133 of the generator 15 to follow the current reference 139. For example, in one embodiment, a detected rotor current signal of the generator 15 may be used as the current feedback signal 133 and a rotor current reference may be used as the current reference 139. More specifically, a current difference signal 204 is generated by a subtraction of the rotor current reference 139 and the rotor current feedback signal 133 via a summation element 203. Then the current difference signal 204 is sent to the regulator 125 for outputting a regulated signal 213, and the regulated signal 213 is input to a summation element 215. The regulated signal 213 comprises a voltage signal in one embodiment. Because in this case, the control loop B is disabled so that no signal is output, the control signal 141 is obtained after the regulated signal 213 passes through the summation element 215. The control signal 141 comprises the regulated signal 213. The control signal 141 is then output to the modulator 127 where the source side switching signals 145 are generated by comparing the control signal 141 with the carrier wave 143. The source side switching signals 145 are provided to the power generation system 10, more specifically, to the source side converter 101. As a result, the rotor current feedback signal 133 is adjusted to track the rotor current reference 139.

Under abnormal operating conditions of a torque or oscillation transient, when the detected signal 131 is outside a predetermined range, the detection unit 121 generates the abnormal status signal 135, and the feature of the abnormal status signal 135 indicates that the power generation system 10 is under abnormal operating conditions of a torque or oscillation transient. Continuing to refer to FIG. 2, the virtual impedance generator 123 then generates the virtual impedance signal 137 in response to the abnormal status signal 135, and the control loop B is used. In the illustrated embodiment of FIG. 2, the virtual impedance signal 137 is an embodiment of a virtual resistance triggered by the detection unit 121. In this example, the virtual impedance generator 123 includes a virtual resistor which can provide additional damping in case of disturbance. Furthermore, the virtual impedance generator 123 may also or alternatively include inductive or capacitive components for phase correction. In one embodiment, the first enable signal 205 may be set as 0 and the second enable signal 207 may set as 1 which means that the control loop B works and the control loop A does not work. In the illustrated embodiment, the control loop B is configured to damp the torque or damp the oscillations of the grid power. Based on the virtual impedance signal 137 generated by the virtual impedance generator 123, the compensation unit 201 outputs a compensated signal 211 by multiplying the virtual impedance signal 137 by the current feedback signal 133 of the generator 15, for example, the rotor current feedback signal and the compensated signal 211 is input to the summation element 215. The compensated signal 211 comprises a voltage signal in one embodiment. Because in this case, the control loop A is disabled so that no signal is output, the control signal 141 is obtained after the compensated signal 211 passes through the summation element 215. The control signal 141 comprises the compensated signal 211. Since the compensated signal 211 comes from the virtual impedance signal 137, the control signal 141 comprises the virtual impedance signal 137. The control signal 141 is then output to the modulator 127 where the source side switching signals 145 are generated by comparing the control signal 141 with the carrier wave 143. The source side switching signals 145 are provided to the source side converter 101 so that the torque or the oscillations of the grid power is damped.

Sometimes the power generation system 10 operates at slightly abnormal conditions which are less significant than the torque transients or grid voltage or current oscillations that create abnormal operating conditions. Examples include weak grid conditions wherein more power or more reactive power is needed to be provided to the power network 18. In such circumstances, the detection unit 121 may still generate the abnormal status signal 135, and the feature of the abnormal status signal 135 indicates the power generation system 10 operates at slightly abnormal conditions. The virtual impedance generator 123 may then generate the virtual impedance signal 137. However, continuing to refer to FIG. 2, rather than using the control loop B alone, both the control loop A and the control loop B are used. In one further example of the embodiment of FIG. 2, the virtual impedance signal 137 may comprise a virtual inductance or capacitance to provide reactive power injection in accordance with active power. In one embodiment, the first enable signal 205 may be set as 1 and the second enable signal 207 may be also set as 1 which means that both of the control loops A and B work. Both of the regulator 125 and the compensation unit 201 are included. Based on the virtual impedance signal 137 generated by the virtual impedance generator 123, the compensation unit 201 outputs the compensated signal 211 by multiplying the virtual impedance signal 137 by the rotor current feedback signal 133. The current difference signal 204 is generated by a subtraction of the rotor current reference 139 and the rotor current feedback signal 133 via the summation element 203. Then the current difference signal 204 is sent to the regulator 125 for outputting the regulated signal 213. The compensated signal 211 and the regulated signal 213 are both input to the summation element 215. The control signal 141 is obtained by summing the compensated signal 211 and the regulated signal 213 via the summation element 215. The control signal 141 comprises the compensated signal 211 and the regulated signal 213. Since the compensated signal 211 comes from the virtual impedance signal 137, the control signal 141 comprises the virtual impedance signal 137 and the regulated signal 213. Then the control signal 141 is output to the modulator 127. The source side switching signals 145 are generated by comparing the control signal 141 with the carrier wave 143 and the source side switching signals 145 are then provided to the source side converter 101. In one embodiment of compensation for weak grid connectivity, the virtual impedance generator 123 includes a virtual capacitor and the virtual impedance signal 137 includes a virtual capacitance. Since the power network 18 has larger impedance and inductive characteristics, the total impedance of the power generation system 10 is reduced and the capacitive reactive power in accordance with the active power is automatically provided by providing the virtual impedance signal 137 including the virtual capacitance. In another embodiment of compensation for slightly abnormal operating conditions, the virtual impedance generator 123 includes a virtual inductor and the virtual impedance signal 137 includes a virtual inductance. For example, when the grid voltage is a little high, by providing the virtual impedance signal 137 including the virtual inductance can help absorb inductive reactive power from the power network 18 to help lower the grid voltage.

Figure 3:
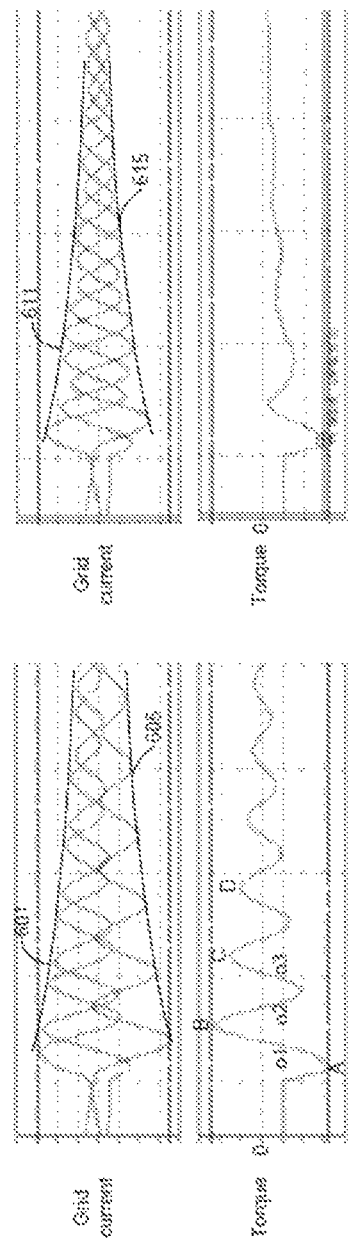
FIG. 3 is a graph of simulated waveforms for comparing a normal controller with a source side controller comprising a virtual impedance generator in the power conversion system of FIG. 1.

Referring to FIG. 3, simulated waveforms for comparing the normal controller 129 with the source side controller 111 comprising the virtual impedance generator 123 in the power conversion system 16 of FIG. 1 are shown. FIG. 3(A) shows simulated three-phase grid current waves and an electrical torque of the generator 15 when the normal controller 129 as shown in FIG. 1 is implemented alone in the source side controller 111. FIG. 3(B) shows the simulated three-phase grid current waves and the electrical torque of the generator 15 when both of the normal controller 129 and the virtual impedance generator 123 as shown in FIG. 1 are implemented in the source side controller 111. In this simulation, there are both grid current oscillations and torque oscillations.

Without using the virtual impedance generator 123, oscillating grid current components have a slower attenuation as can be seen from envelope lines 601 and 605 shown in FIG. 3(A) as compared to envelope lines 611 and 615 shown in FIG. 3(B).

By comparisons of FIG. 3(A) and FIG. 3(B), without using the virtual impedance generator 123, the electrical torque has several zero crossing points such as o1, o2, and o3 of FIG. 3(A), and torque peaks such as A, B, C, and D of FIG. 3(A) are large which causes more stress between the generator 15 and the power source 11. However, when using the virtual impedance generator 123, as shown in FIG. 3(B), there are no zero crossing points and the torque peaks are damped to a smaller value. Therefore, stress between the electrical torque and the mechanical torque is damped.

Figure 4:
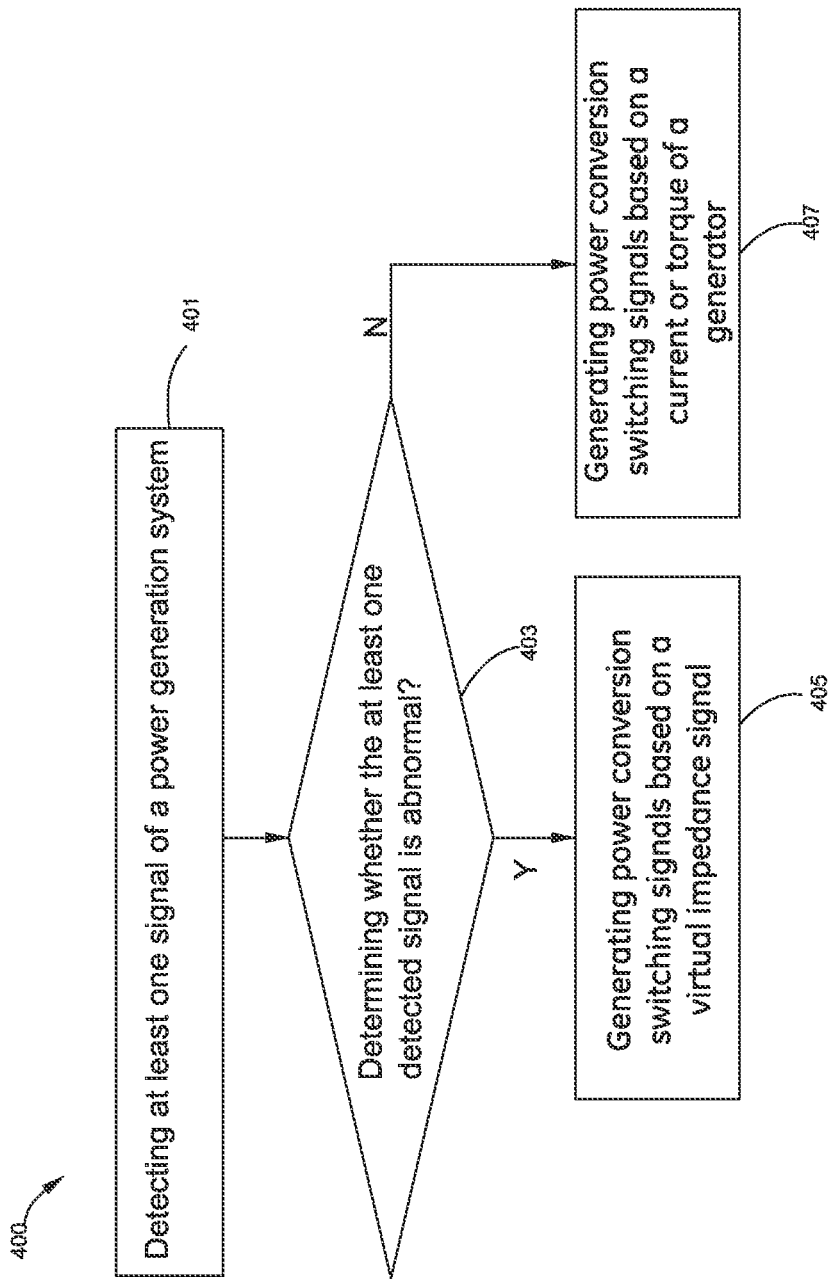
FIG. 4 is a flowchart of a method for controlling the power generation system of FIG. 1 in accordance with one exemplary embodiment.

Referring to FIG. 4, a flowchart of a method for controlling the power generation system 10 of FIG. 1 in accordance with one exemplary embodiment is shown. The method 400 starts at block 401 wherein at least one signal of the power generation system 10 is detected. At block 403, whether the at least one detected signal is abnormal is determined. If no signal of the at least one detected signal is determined to be abnormal, that is to say, no abnormal status signal 135 exists, the process goes to block 407. If any signal of the at least one detected signal is determined to be abnormal, at this time, an abnormal status signal 135 is generated and the process goes to block 405. At block 407, power conversion switching signals 145 are generated based on a current or torque of the generator 15 coupled to the power source 11 in the power generation system 10. Generating the power conversion switching signals 145 comprises comparing a control signal 141 with at least one carrier wave 143. The control signal 141 comprises a regulated signal 213. At block 405, power conversion switching signals 145 are generated based on a virtual impedance signal 137 for system damping or reactive power compensation. The virtual impedance signal 137 is generated based on an abnormal status signal 135. The detailed information of how the virtual impedance signal is operated in generating the power conversion switching signals is illustrated above. Generating the power conversion switching signals 145 comprises comparing a control signal 141 and at least one carrier wave 143. The control signal 141 comprises the virtual impedance signal 137 or a combination of the virtual impedance signal 137 and the regulated signal 213 depending upon a feature of the abnormal status signal 135. In one embodiment, when the feature of the abnormal status signal 135 indicates that a torque or an electrical power is damped, the control signal 141 is generated by the virtual impedance generator 123 in the power generation system 10, and the control signal 141 comprises the virtual impedance signal 137. In another embodiment, when the feature of the abnormal status signal 135 indicates that a reactive power compensation is provided, the control signal 141 is generated by the virtual impedance generator 123 and the regulator 125 in the power generation system 10, and the control signal 141 comprises the combination of the virtual impedance signal 137 and the regulated signal 213.

By adding the virtual impedance generator 123 and selectively generating the virtual impedance signal 137 depending upon the actual operating condition of the system, the present invention can limit or eliminate torque transients and grid voltage or current oscillations, effectively reduce the loads and stress, and further enhance the life time of the mechanical components and lower the total product cost.

Further, as will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

The invention claimed is:

1. A power conversion system comprising:
   a source side converter for being electrically coupled to a generator of a power source;
   a line side converter for being electrically coupled to a power network;
   a DC link coupled between the source side converter and the line side converter; and
   a controller for generating source side switching signals for the source side converter based on a virtual impedance signal for system damping or reactive power compensation, and one of a current feedback signal of the generator or a torque feedback signal of the generator when at least one detected signal of the power conversion system is not normal.

2. The power conversion system of claim 1, wherein the controller comprises a detection unit for receiving the at least one detected signal and generating an abnormal status signal when the at least one detected signal is not normal, and wherein the controller is programmed for generating the virtual impedance signal based on the abnormal status signal.

3. The power conversion system of claim 2, wherein when the at least one detected signal is beyond a predetermined range or the detected signal comprises oscillations, the abnormal status signal is generated.

4. The power conversion system of claim 1, wherein the at least one detected signal comprises a DC voltage at the DC link, a grid current, a grid voltage, or an electrical power.

5. The power conversion system of claim 1, wherein the controller comprises a source side controller and a line side controller, and wherein the source side controller comprises:
- a detection unit for receiving the detected signal and generating an abnormal status signal when the at least one detected signal is not normal;
- a virtual impedance generator for generating the virtual impedance signal based on the abnormal status signal;
- a regulator for generating a regulated signal based on one of a current reference or a torque reference, and one of the current feedback signal or the torque feedback signal; and
- a modulator for generating the source side switching signals by comparing a control signal with at least one carrier wave, wherein the control signal comprises the virtual impedance signal, the regulated signal, or combinations thereof depending upon an existence of the abnormal status signal and a feature of the abnormal status signal.

6. The power conversion system of claim 5, wherein the control signal comprises both the virtual impedance signal and the regulated signal during reactive power compensation.

7. The power conversion system of claim 5, wherein the control signal comprises the virtual impedance signal and not the regulated signal during system damping.

8. The power conversion system of claim 1, wherein the power source comprises a wind turbine, and wherein the source side converter is coupled to a rotor of the generator.

9. A method for controlling a power generation system, wherein the power generation system comprises a source side converter, a line side converter and a DC link coupled between the source side converter and the line side converter, the method comprising:
- detecting at least one signal of the power generation system;
- determining whether the at least one signal is abnormal; and
- when any signal of the at least one signal is determined to be abnormal, generating source side switching signals for the source side converter based on a virtual impedance signal for system damping or reactive power compensation.

10. The method of claim 9, further comprising: if any signal of the at least one signal is determined to be abnormal, generating the virtual impedance signal based on an abnormal status signal.

11. The method of claim 9, wherein the at least one signal comprises a DC voltage at the DC link of the power generation system, a grid current, a grid voltage or an electrical power of a generator of the power generation system.

12. The method of claim 9, wherein generating the source side switching signals comprises comparing a control signal and at least one carrier wave.

13. The method of claim 12, further comprising: generating the control signal by a virtual impedance generator and a regulator when the reactive power compensation is provided.

14. The method of claim 12, further comprising: generating the control signal by a virtual impedance generator when a torque or an electrical power is damped.

15. A wind turbine power generation system comprising:
- a wind turbine rotor for generating mechanical power;
- a generator for converting the mechanical power to electrical power;
- a converter for converting the electrical power to a desired electrical power for supplying to a power network, comprising a source side converter, a line side converter, and a DC link coupled between the source side converter and the line side converter;
- at least one sensor for obtaining at least one detected signal in the wind turbine power generation system; and
- a controller for generating source side switching signals for the source side converter based on a virtual impedance signal for system damping or reactive power compensation, and one of a current feedback signal of the generator or a torque feedback signal of the generator when the at least one detected signal of the wind turbine power generation system is not normal.

16. The wind turbine power generation system of claim 15, wherein the generator comprises a rotor coupled to the source side converter and a stator coupled to the power network.

17. The wind turbine power generation system of claim 15, wherein the controller comprises a source side controller and a line side controller, and wherein the source side controller comprises:
- a detection unit for receiving the at least one detected signal and generating an abnormal status signal when the at least one detected signal is not normal;
- a virtual impedance generator for generating the virtual impedance signal based on the abnormal status signal;
- a regulator for generating a regulated signal based on one of a current reference or a torque reference, and one of the current feedback signal or the torque feedback signal; and
- a modulator for generating the converter switching signals by comparing a control signal with at least one carrier wave, wherein the control signal comprises the virtual impedance signal, the regulated signal, or combinations thereof depending upon an existence of the abnormal status signal and a feature of the abnormal status signal.

18. The wind turbine power generation system of claim 17, wherein the control signal comprises both the virtual impedance signal and the regulated signal during reactive power compensation, and wherein the control signal comprises the virtual impedance signal and not the regulated signal during system damping.

19. The wind turbine power generation system of claim 15, wherein the at least one detected signal comprises a DC voltage at the DC link, a grid current, a grid voltage or an electrical power.

* * * * *